United States Patent Office

3,493,539
Patented Feb. 3, 1970

3,493,539
ETHYLENICALLY UNSATURATED DERIVATIVES OF 2-(2-HYDROXYPHENYL) BENZOTRIAZOLE AND POLYMERS THEREFROM
Martin Skoultchi, Somerset, Joseph Fertig, Elizabeth, and Leonard I. Nass, Martinsville, N.J., assignors to National Starch and Chemical Corporation, New York, N.Y., a corporation of Delaware
No Drawing. Continuation-in-part of application Ser. No. 535,325, Mar. 18, 1969. This application Nov. 13, 1968, Ser. No. 775,496
Int. Cl. C08f 7/10
U.S. Cl. 260—47    8 Claims

ABSTRACT OF THE DISCLOSURE

Novel monomeric, ethylenically unsaturated derivatives of 2-(2-hydroxyphenyl) benzotriazole are prepared which may then be copolymerized with conventional vinyl monomers. The resulting copolymers thereafter display outstanding resistance to the degradative effects of ultra-violet radiation as a result of the presence, therein, of the moieties derived from the above described monomeric benzotriazole derivatives.

RELATED APPLICATION

This application is a continuation-in-part of our copending application Ser. No. 535,325, filed Mar. 18, 1966, now abandoned.

BACKGROUND OF THE INVENTION

The incorporation of ultra-violet light absorbers in the synthetic plastics derived from high polymers is, of course, a practice well known to those skilled in the art. Such ultraviolet absorbers are required since outdoor exposure to natural sunlight or continuous indoor exposure to fluorescent light tends to degrade most plastics and this photodegradation of plastics is, in turn, known to be caused by the ultra-violet portion of light. Such degradation is observable in a plastic as a change in color, such as a yellowing or darkening, and/or by a deterioration of its physical properties, such as its flexural strength and elongation.

In an attempt to overcome these deleterious effects of ultra-violet radiation, the addition of ultra-violet absorbers or stabilizers, such as the phenyl salicylates, the ortho-hydroxy benzophenones and the 2-(2-hydroxyphenyl) benzotriazoles, has of late become of considerable commercial interest. In order to be effective, such materials should be able to absorb strongly in the ultra-violet range of from 300–400 millimicrons without undergoing any change in structure. In addition, they must possess many other properties such as low color, good compatibility, heat stability, low odor, low volatility, chemical stability and chemical inertness. Furthermore, a complete lack of toxicity as well as the total absence of any migration from the formulated polymer are two important prerequisites of any ultra-violet stabilizers which are to be used in plastics or coatings which are to be employed as wrappers or containers for food products.

One of the methods used for the stabilization of synthetic resins has involved the preparation of ethyleni- cally unsaturated derivatives of such known ultra-violet absorbing compounds as the previously listed phenyl salicylates, orthohydroxy benzophenones or 2-(2-hydroxyphenyl) benzotriazoles. These monomeric derivatives are then polymerized with various comonomers so as to result in the preparation of copolymers containing moieties derived from these ethylenically unsaturated ultra-violet absorbing compounds. Such copolymers are thus, in effect, provided with "built-in" protection against the degradative effects of ultra-violet radiation.

U.S. Patent No. 3,399,173, to Heller et al., relates to the preparation of ethylenically unsaturated derivatives of 2-(2'-hydroxyphenyl)-benzotriazole compounds. These derivatives may be prepared by several procedures which include:

(1) Conversion of an azo compound containing an ethylenically unsaturated group into the corresponding 2-(2'-hydroxyphenyl)-benzotriazole compound as, for example, by oxidizing a 2-amino-2'-hydroxy-1,1'-azobenzene compound containing at least one ethylenically unsaturated group with salts of divalent copper in a neutral to alkaline medium or by reducing a 2-nitro-2'-hydroxy-1,1'-azobenzene compound containing at least one such group with zinc dust in an alkaline medium;

(2) By introducing a substituent containing an ethylenically unsaturated group into a 2-(2'-hydroxyphenyl)-benzotriazole compound, as for example, by acylating a 2-(2'-hydroxyphenyl)-benzotriazole compound containing at least one acylatable hydroxyl or amino group with an ethylenically unsaturated acylating agent such as acrylic or methacrylic acid;

(3) By forming an ethylenically unsaturated group in a side chain of a 2-(2'-hydroxyphenyl)-benzotriazole compound as, for example, by splitting off halogen hydracid from 2 - (2' - hydroxyphenyl)-benzotriazole compounds beta-halogen alkyl groups fith basic reactants; and (4) By rearranging, according to Claisen, a 2-(2'-alkenyloxyphenyl)-benzotriazole compound containing replaceable hydrogen in the 3'-position into the corresponding 3'-alkenyl compound.

Although the particular monomeric benzotriazole derivatives described in the Heller et al. patent offer an effective means of preparing copolymers having built-in resistance to ultra-violet radiation, the complexity of the aforedescribed reaction procedures would appear to preclude their widespread commercial utlization. Thus, each of the applicable synthetic routes is seen to involve a number of complex and time consuming procedures. Needless to say, a simpler more direct method of preparing derivatives of this type would be highly desirable.

It is, thus, a basic object of this invention to provide a novel class of ethylenically unsaturated derivatives of 2-(2-hydroxyphenyl) benzotriazole, by means of a simple, one-step procedure, said derivatives being capable of undergoing vinyl type polymerization reactions so as to lead to the preparation of homopolymers and, more particularly, of copolymers which in all cases are capable of containing a substantial proportion of moieties derived from the latter derivatives.

A further object of this invention involves the preparation of polymerizable derivatives of 2-(2-hydroxyphenyl) benzotriazole and their subsequent incorporation into a wide variety of copolymers so as to effectively stabilize such copolymers against the degradative effects of ultraviolet radiation.

DETAILED DESCRIPTION OF THE INVENTION

The novel compositions of this invention are the ethylenically unsaturated derivatives of 2-(2-hydroxyphenyl) benzotriazole corresponding to the formulae:

(1) 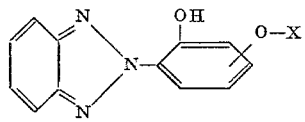

(2) 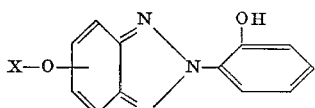

(3) 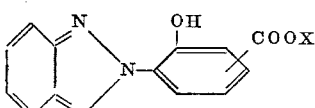

(4) 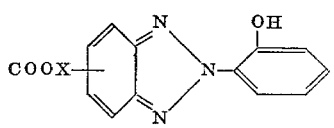

wherein X represents an ethylenically unsaturated group selected from the class consisting of the beta-hydroxypropyl acrylate, i.e.

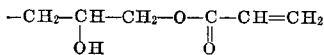

beta-hydroxypropyl methacrylate, i.e.

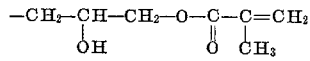

(3-allyloxy-2-hydroxy)propyl, i.e.

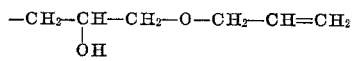

and, (3-hydroxy)butenyl-1, i.e.

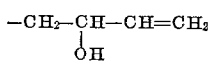

radicals; wherein O—X in the derivatives of Group 1 is attached to the 2-hydroxyphenyl ring of the 2-(2-hydroxyphenyl)benzotriazole nucleus in either the 3, 4 or 5 position; wherein O—X in the derivatives of Group 2 is attached to the benzotriazole ring of the 2-(2-hydroxyphenyl)benzotriazole nucleus in either the 4 or 5 position; wherein —COOX in the derivatives of Group 3 is attached to the 2-hydroxyphenyl ring of the 2-(2-hydroxyphenyl) benzotriazole nucleus in either the 4 or 5 position; wherein —COOX in the derivatives of Group 3 is attached to the 2-hydroxyphenyl ring of the 2-(2-hydroxyphenyl)benzotriazole nucleus in either the 3, 4 or 5 position; and, wherein COOX in the derivatives of Group 4 is attached to the benzotriazole ring of the 2-(2-hydroxyphenyl)benzotriazole nucleus in either the 4 or 5 position.

As representative of the above described 2-(2-hydroxyphenyl)benzotriazole derivatives of our invention, one may list the following compounds all of which may be characterized as ethers and esters of 2-(2-hydroxyphenyl) benzotriazole:

3-(3-acryloxy-2-hydroxypropyl)ether of 2-(2,3-dihydroxyphenyl)benzotriazole;
3-(3-methacryloxy-2-hydroxypropyl)ether of 2-(2,3-dihydroxyphenyl)benzotriazole;
3-(3-hydroxybutenyl-1)ether of 2-(2,3-dihydroxyphenyl)benzotriazole;
3-(3-allyloxy-2-hydroxypropyl)ether of 2-(2,3-dihydroxyphenyl)benzotriazole;
4-(3-acryloxy-2-hydroxypropyl)ether of 2-(2,4-dihydroxyphenyl)benzotriazole;
4-(3-methacryloxy-2-hydroxypropyl)ether of 2-(2,4-dihydroxyphenyl)benzotriazole;
4-(3-hydroxybutenyl-1)ether of 2-(2,4-dihydroxyphenyl)benzotriazole;
4-(3-allyloxy-2-hydroxypropyl)ether of 2-(2,4-dihydroxyphenyl)benzotriazole;
5-(3-acryloxy-2-hydroxypropyl)ether of 2-(2,5-dihydroxyphenyl)benzotriazole;
5-(3-methacryloxy-2-hydroxypropyl)ether of 2-(2,5-dihydroxyphenyl)benzotriazole;
5-(3-hydroxybutenyl-1)ether of 2-(2,5-dihydroxyphenyl)benzotriazole;
5-(3-allyloxy-2-hydroxypropyl)ether of 2-(2,5-dihydroxyphenyl)benzotriazole;
4-(3-acryloxy-2-hydroxypropyl)ether of 4-hydroxy-2-(2-hydroxyphenyl)benzotriazole;
4-(3-methacryloxy-2-hydroxypropyl)ether of 4-hydroxy-2-(2-hydroxyphenyl)benzotriazole;
4-(3-hydroxybutenyl-1) ether of 4-hydroxy-2-(2-hydroxyphenyl)benzotriazole;
4-(3-allyloxy-2-hydroxypropyl)ether of 4-hydroxy-2-(2-hydroxyphenyl)benzotriazole;
5-(3-acryloxy-2-hydroxypropyl)ether of 5-hydroxy-2-(2-hydroxyphenyl)benzotriazole;
5-(3-methacryloxy-2-hydroxypropyl)ether of 5-hydroxy-2-(2-hydroxyphenyl)benzotriazole;
5-(3-hydroxybutenyl-1)ether of 5-hydroxy-2-(2-hydroxyphenyl)benzotriazole;
5-(3-allyloxy-2-hydroxypropyl)ether of 5-hydroxy-2-(2-hydroxyphenyl)benzotriazole;
3-(3-acryloxy-2-hydroxypropyl)ester of 2-(3-carboxy-2-hydroxyphenyl)benzotriazole;
3-(3-methacryloxy-2-hydroxypyl)ester of 2-(3-carboxy-2-hydroxyphenyl)benzotriazole;
3-(3-hydroxybutenyl-1)ester of 2-(3-carboxy-2-hydroxyphenyl)benzotriazole;
3-(3-allyloxy-2-hydroxypropyl)ester of 2-(3-carboxy-2-hydroxyphenyl)benzotriazole;
4-(3-acryloxy-2-hydroxypropyl)ester of 2-(4-carboxy-2-hydroxyphenyl)benzotriazole;
4-(3-methacryloxy-2-hydroxypropyl)ester of 2-(4-carboxy-2-hydroxyphenyl)benzotriazole;
4-(3-hydroxybutenyl-1)ester of 2-(4-carboxy-2 hydroxyphenyl)benzotriazole;
4-(3-allyloxy 2 hydroxypropyl)ester of 2-(4-carboxy-2-hydroxyphenyl)benzotriazole;
5-(3-acryloxy-2-hydroxypropyl)ester of 2-(5-carboxy-2-hydroxyphenyl)benzotriazole;
5-(3-methacryloxy-2-hydroxypropyl)ester of 2-(5-carboxy-2-hydroxyphenyl)benzotriazole;
5-(3-hydroxybutenyl-1)ester of 2-(5-carboxy-2-hydroxyphenyl)benzotriazole;
5-(3-allyloxy-2-hydroxypropyl)ester of 2-(5-carboxy-2-hydroxyphenyl)benzotriazole;
4-(3-acryloxy-2-hydroxypropyl)ester of 4-carboxy-2-(2-hydroxyphenyl)benzotriazole;
4-(3-methacryloxy-2-hydroxypropyl) ester of 4-carboxy-2-(2-hydroxyphenyl)benzotriazole;
4-(3-hydroxybutenyl-1)ester of 4-carboxy-2-(2-hydroxyphenyl)benzotriazole;
4-(3-allyloxy-2-hydroxypropyl)ester of 4-carboxy-2-(2-hydroxyphenyl)benzotriazole;
5-(3-acryloxy-2-hydroxypropyl)ester of 5-carboxy-2-(2-hydroxyphenyl)benzotriazole;
5-(5-methacryloxy-2-hydroxypropyl)ester of 5-carboxy-2-(2-hydroxyphenyl)benzotriazole;
5-(3-hydroxybutenyl-1)ester of 5-carboxy-2-(2-hydroxyphenyl)benzotriazole; and,
5-3-allyloxy-2-hydroxypropyl)ester of 5-carboxy-2-(2-hydroxyphenyl)benzotriazole.

All of the above listed compounds, as well as any others which may correspond to the above definition, are materials which are capable of readily undergoing vinyl type polymerization reactions. They are thus useful for the preparation of copolymers with a wide variety of other vinyl type monomers. These copolymers are especially outstanding in regard to their superior light stability. This improve stability is imparted to these copolymers as a result of the presence therein of the 2-(2-hydroxyphenyl)benzotriazole moiety which is permanently bound into and inherently part of the resulting copolymer molcule as a result of the incorporation therein of the ethylenically unsaturated 2-(2-hydroxyphenyl) benzotriazole derivatives of our invention.

In brief, the synthesis of our novel derivatives is accomplished by the catalyzed reaction of a selected 2-(2-hydroxyphenyl)benzotriazole intermedite, as hereinafter defined, with an ethylenically unsaturated reagent selected from the group consisting of glycidyl acrylate, glycidyl methacrylate, allyl glycidyl ether, and butadiene monoxide.

The 2 - (2 - hydroxyphenyl)benzotriazole compounds which are applicable for use as intermediates in preparing the novel ethylencially unsaturated benzotriazole dedivatives of this invention include:

5-hydrovy-2-(2-hydroxyphenyl)benzotriazole, ie. 2-(2,3-dihydroxyphenyl)benzotriazole, i.e.

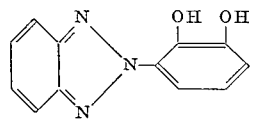

2-(2,4-dihydroxyphenyl)benzotriazole, i.e.

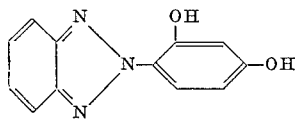

2-(2,5-dihydroxyphenyl)benzotriazole, i.e

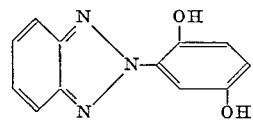

4-hydroxy-2-(2-hydroxyphenyl)benzotriazole, i.e

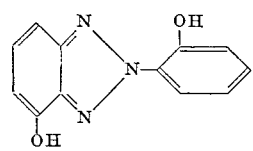

5-hydroxy-2-(2-hydroxyphenyl)benzotriazole, i.e.

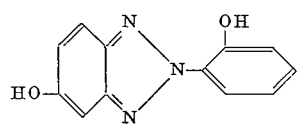

2-(3-carboxy-2-hydroxyphenyl)benzotriazole, i.e.

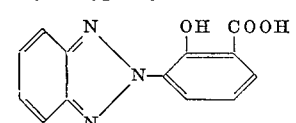

2-(4-carboxy-2-hydroxyphenyl)benzotriazole, i.e.

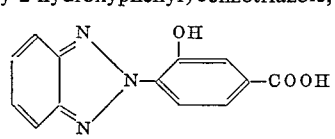

2-(5-carboxy-2-hydroxyphenyl)benzotriazole, i.e.

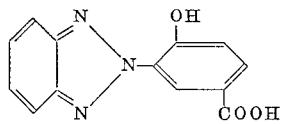

4-carboxy-2-(2-hydroxyphenyl)benzotriazole, i.e.

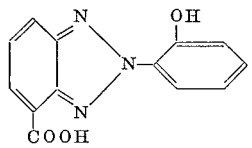

and 5-carboxy-2-(2-hydroxyphenyl)benzotriazole, i.e.

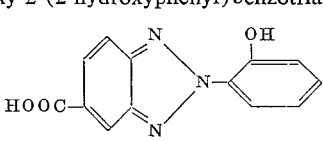

Moreover, the latter intermediates may, if desired, be further substituted upon either their phenyl or benzo rings with one or more of various substituent groups such, for example, as the halogeno, alkyl, or alkoxy groups.

In conducting the reaction which leads to the synthesis of our novel derivatives, the selected ethylenically unsaturated reagent, in an equimolar concentration or a concentration amounting to a slight stoichiometric excess in the order of about 10 to 20% over the subsequently added 2-(2-hydroxyphenyl)benzotriazole intermediate, is first ordinarily admixed with the selected catalyst. The latter may be chosen from among any member of the group consisting of the alkali metal hydroxides, such as sodium hydroxide or potassium hydroxide; the salts of alkali metals, such as sodium bicarbonate or sodium chloride; and, the quaternary ammonium halides, such as tetramethyl ammonium chloride or tetrabutylammonium iodide. These catalysts should be present in concentrations of about 0.1 to 5.0%, as based upon the weight of the ethylenically unsaturated reagent.

Following the initial preparation of the mixture comprising the catalyst and the ethylenically unsaturated reagent, the 2-(2-hydroxyphenyl)benzotriazole intermediate is thereupon added with continued agitation. However, it should be emphasized that the use of this particular sequence is not critical to the process of our invention and may be altered by the practitioner to suit his particular needs. It is, in fact, possible to admix the reactants and the catalyst in any desired sequence. In any event, following the complete admixture of the 2-(2-hydroxyphenyl)benzotriazole intermediate with the catalyst and the ethylenically unsaturated reagent, agitation is continued while the resulting reaction mixture is maintained at a temperature in the range of about 50° to 100° C., and preferably at about 80° to 90° C., for periods of about 6 to 14 hours. Under these conditions the reaction between the 2-(2-hydroxyphenyl)benzotriazole intermediate and the ethylenically unsaturated reagent will ordinarily proceed at a conversion in the range of about 80 to 95%.

In general, the preparation of the derivatives of our invention may be conducted at any temperature which will be high enough so as to result in an adequate reaction rate. However, inasmuch as some of these derivatives display very little tendency to homopolymerize, they may if desired be prepared at rather high temperatures without any danger of their spontaneous polymerization. In addition, the length of the reaction period will depend, for the most part, upon the specific ethylenically unsaturated reagent which is being utilized. Thus, it is a matter of ordinary preparative experience on the part of the practitioner to determine the precise combination of time and temperature which will be best suited for his synthesis of any of the novel 2-(2-hydroxyphenyl)benzotriazole derivatives coming within the scope of our invention, since the examples herein are merely illustrative.

Upon the completion of the reaction and with subsequent cooling of the reaction vessel to room temperature, the resulting products will ordinarily be in the form of either viscous oils or semi-solids. For most purposes, including any subsequent polymerization reactions, this crude ethylenically unsaturated 2-(2-hydroxyphenyl) benzotriazole derivative can then be used without any further purification being necessary. However, where desired, the relatively small amount of unreacted 2-(2-hydroxyphenyl) benzotriazole may be removed. Thus, such means as chromatographic separation techniques, as for example with the use of a silica gel column, have been found to yield a product which, by means of saponification equivalent analysis, will indicate a purity of almost 100%, by weight. Other separation techniques, such as aqueous alkali or organic solvent extraction procedures, may also be used where so desired by the practitioner.

It is also possible to prepare the novel derivatives of our invention by reaction in an organic solvent medium. Under these conditions, the 2-(2-hydroxyphenyl)benzotriazole intermediate, the catalyst, and the ethylenically unsaturated reagent may all be dissolved in a non-reactive polar solvent such as acetone, methyl ethyl ketone, butyl acetate, tetrahydrofuran, dimethylformamide or dimethylsulfoxide. The resulting derivative would then be recovered by distilling off the solvent whereupon the crude product could, again, be purified by means of the above noted techniques.

In utilizing our ethylenically unsaturated 2-(2-hydroxyphenyl)benzotriazole derivatives in the preparation of homo- and copolymers, there may be employed any of the usual vinyl polymerization methods which are well known to those skilled in the art and which is particularly suited for the homo- or copolymer whose preparation is desired. Thus, such polymers may be prepared by means of free radical initiated processes utilizing bulk, suspension, solution, or emulsion polymerization techniques; or, they may be prepared by ionic catalysis or by means of stereospecific catalysts such as those of the type developed by Ziegler.

The comonomers which may be utilized together with the above described ethylenically unsaturated 2-(2-hydoxyphenyl)benzotriazole derivatives for the preparation of the ultra-violet stable copolymers of our invention can be any ethylenically unsaturated monomer such, for example, as styrene; alpha-methyl styrene; the acrylic and methacrylic acid esters of aliphatic alcohols such as methyl, ethyl, propyl, butyl, isobutyl, amyl, hexyl, 2-ethyl, hexyl, octyl, lauryl and stearyl alcohols; acrylic acid, methacrylic acid; isoprene; acrylamide; acrylonitrile; methacrylonitrile; butadiene; vinyl propionate; dibutyl fumarate; dibutyl maleate; diallyl phthalate; vinylidene chloride; vinyl chloride; vinyl fluoride; vinyl acetate, ethylene; and, propylene, etc. Any of these monomers may be used either alone or in combination with one another together with one or more of the 2-(2-hydroxyphenyl)benzotriazole containing monomers.

In order to effectively withstand the effects of ultra-violet radiation, the copolymers of our invention should contain at least 0.1% by weight, of these ethylenically unsaturated 2-(2-hydroxyphenyl)benzotriazole derivatives. As for the maximum concentration, this will depend, of course, upon the particular comonomer as well as on the specific end use application of the resulting copolymer. However, in most cases a concentration of about 5.0%, by weight, will be fully adequate with economically effective results being obtained with a concentration in the range of about 2.0%. Larger quantities of up to about 10–20% may be used in order to obtain copolymers which are especially suited for use as coatings.

In any event, the homo- and copolymers of our invention, whether prepared by means of bulk, suspension, solution, or emulsion polymerization techniques or by other means, are all characterized by their improved stability to light. This improved stability is fully equivalent, and in many cases superior, to the results obtained when extraneous ultra-violet light absorbers are added to the comparable polymers which do not contain these 2-(2-hydroxyphenyl)benzotriazole derivatives. Moreover, all of the deficiencies which are inherent in the use of these extraneous stabilizers are completely avoided with the products of our invention. Thus, our novel polymeric compositions offer protection against the degradative effects of ultra-violet radiation while eliminating problems of volatility, toxicity and migration.

There are several different techniques by which the homo- and copolymers of our invention may be utilized. Thus, where possible, they may be directly fabricated into such forms as coatings, films, sheeting and other solid shapes which may then be further fabricated into various industrial and consumer articles. On the other hand, our products may also be physically blended with a wide variety of polymers and these blends may then be used as desired. Another approach involves the coating of films or lamination of free films of our compositions to various polymeric substrates, these films thereby serving to protect said substrates from the effects of ultra-violet radiation. Or alternatively, such copolymers may, if compatible, be directly blended with the cellulosics or spar varnishes and thereby impart the advantages of the compositions of our invention to these materials.

Illustrative of some widely used plastics which require the use of ultra-violet stabilizers are polyesters, polystyrene, polyvinyl chloride, polyethylene and polyvinylidene chloride. Polyesters, namely, the unsaturated polyesters having ethylenic unsaturation resulting from the presence of alpha, beta-unsaturated carboxylic acids such as maleic and fumaric acid, are typically formulated with monomeric styrene or methyl methacrylate and, in conjunction with fiber glass reinforcement, are employed in the preparation of corrugated and flat sheeting products. The latter are used as roofings, awnings, walk coverings, glazings for windows, skylights, etc. Another large volume outlet for polyester resins is in the construction of plastic boats. Most of these applications require outdoor exposure durability. However, unless they are stabilized, the polyester resins tend to yellow and physically deteriorate. In overcoming this poor stability on the part of the polyester resins, the practitioner need merely introduce one of the above described 2-(2-hydroxyphenyl) benzotriazole monomers together with the styrene or methyl methacrylate monomer, the polymerization catalyst and the unsaturated polyester. The resulting copolymerization reaction will thus result in the homogeneous, chemically bonded incorporation of the ultra-violet absorbing moiety.

Similarly, polystyrene has been recommended as a plastic for automobile reflector lights and indoor light diffusing louvers. However, polystyrene on exposure to either natural or fluorescent light tends to discolor and crack within a short period of time. By copolymerizing styrene, with one of our 2-(2-hydroxyphenyl) benzotriazole derivatives, the resulting homogeneous copolymer is found to be remarkably resistant to both natural and fluorescent light.

Polyvinyl chloride and vinyl chloride copolymer film formulations tend to discolor and become embrittled when exposed to light for prolonged periods of time. Here again, the homogeneous copolymers prepared by copolymerizing with a small amount of one of our monomeric 2-(2-hydroxyphenyl)benzotriazole derivatives tend to minimize the undesirable properties of these polymers. These same improvements are also obtained when polyethylene copolymers are prepared according to the process of our invention; although ordinarily, polyethylene is very unstable to sunlight, becoming embrittled in a matter of months.

It is important to note that, by virtue of its presence, the secondary hydroxy group which is part of the ethylenically unsaturated side chain in all of the novel compounds of this invention, provides these compounds with a degree of versatility as ultra-violet light absorbers which is lacking in the compounds of the prior art as exemplified by the compounds of Heller et al. Thus, the presence of this additional functional group in these compounds provides the practitioner with a means for changing their basic physical properties without effecting any alteration in their ability to absorb ultra-violet light or to function as vinyl type monomers.

For example, by reacting this secondary hydroxy group with a long chain fatty acid chloride, such as stearyl chloride, the resulting substituted monomeric, benzotriazole derivatives are highly soluble, or compatible in non-polar media whereas prior to the latter reaction, the novel compounds of the invention do not possess such solubility characteristics. Of greater significance is the fact that the homo- and copolymers derived from the thus treated monomers still retain their solubility in non-polar media and can thus be readily blended with such non-polar plastics as polyethylene and polypropylene so as to provide compatible compositions wherein the ability of these novel derivatives to absorb ultra-violet radiation would be of much value.

Alternatively, the presence of these secondary hydroxy groups in these novel compounds was found, surprisingly, to allow for their being reacted with an aliphatic or aromatic cyclic anhydride such, for example, as maleic or phthalic anhydride. The latter reaction, which unexpectedly has no effect upon the ethylenic unsaturation of the compounds of this invention, yields an acidic half-ester of these monomeric benzotriazole derivatives which, upon neutralization with alkali, yields a fully water soluble product which is still polymerizable. In contrast, prior to this series of reactions, the novel derivatives of this invention are, of course, insoluble in water. Here again, the homo- and copolymers derived from the thus treated benzotriazole derivatives retain this water solubility and, therefore, are readily formulated with the many polymers which are often utilized in the form of aqueous emulsions or solutions including, for example, polyvinyl acetate and the acrylate ester polymers.

As may be readily appreciated, this unexpected ability on the part of these novel derivatives to be further reacted in order to alter their physical characteristics by means of a simple chemical reaction is a factor of great significance. Obviously, there will be little use for a particular benzotriazole compound which, even though it may be an excellent ultra-violet absorber, nonetheless lacks the desired degree of compatability to be formulated with a polymer so as to yield a mixture wherein it will be successfully retained for prolonged periods. Thus, their ability to be quickly and simply transformed from materials which are normally compatible only with polar solvents and plastics, into materials which display compatibility with either non-polar or aqueous media, is truly an unobvious property which is developed in the novel compounds of this invention and which is seen to be lacking in the compounds disclosed by Heller et al.

Thus, for example, although the benzotriazole derivatives of Heller et al. may have substituent hydroxy groups upon their respective molecules, it will be noted that these hydroxy groups are at all times directly attached to the 2' position of the benzotriazole nucleus rather than being upon a pendant side chain as is the case with the secondary hydroxy groups of the novel derivatives of this invention. Such directly attached hydroxy groups have been found, surprisingly, to be quite different, with respect to their reactivity, as compared with the secondary hydroxy groups of the compounds of the subject invention.

Thus, the hydroxy groups on the 2' position of the benzotriazole compounds of Heller et al. are sterically hindered as a result of hydrogen bonding to the benzotriazole nucleus and are, therefore, unable to react with a vast number of the reagents which readily react with the pendant secondary hydroxy groups of the novel derivatives of this invention. For example, as noted hereinabove, it was found, unexpectedy, that the compounds of this invention can be easily combined, at their secondary hydroxy groups, with an aliphatic or aromatic cyclic anhydride such, for example, as maleic or phthalic anhydride. The latter reaction is not, however, possible with the compounds of Heller et al. and thereby serves to point out their inherent lack of versatility.

The following examples will more clearly illustrate the embodiment of our invention. In these examples, all parts given are by weight unless otherwise noted.

EXAMPLE I

This example illustrates the preparation of the 4-(3-methacryloxy - 2 - hydroxypropyl) ether of 2-(2,4-dihydroxyphenyl) benzotriazole, i.e.

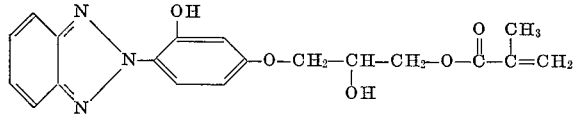

by means of the process of this invention.

An agitated mixture of 15.0 parts of glycidyl methacrylate, 22.7 parts of 2-(2,4-dihydroxyphenyl)benzotriazole, and 0.4 part of tetramethylammonium chloride was heated to a temperature in the range of 85° C. and maintained at this temperature for a period of 12 hours. Upon being cooled to room temperature, the resulting reaction product partially solidified. The resulting material was crystallized from a methanol-water solution whereupon 25.5 parts of the 4-(3-methacrylary-2-hydroxypropyl)ether of 2-(2,4-dihydroxyphenyl)benzotriazole was recovered; the latter figure indicating a conversion of 69%. In addition, the tan reaction product had a melting point of 113–114° C.

EXAMPLE II

This example illustrates the preparation of the 5-(3-hydroxybutenyl-1)ether of 5-hydroxy-2-(2-hydroxyphenyl) benzotriazole, i.e.

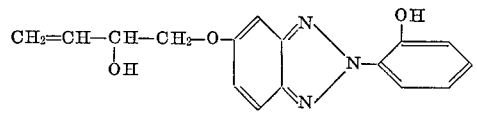

by means of the process of this invention.

An agitated mixture of 7.7 parts of butadiene monoxide, 22.7 parts of 5-hydroxy-2-(2-hydroxyphenyl)benzotriazole, and 0.5 part of ammonium nitrate was heated to a temperature of 90° C. and maintained at that temperature for a period of 12 hours. Upon being cooled to room temperature, the resulting reaction product, which was in the form of a viscous oil, was removed and subjected to a base titration. The latter analysis revealed that there was about 1% of unreacted 5-hydroxy - 2-(2-hydroxyphenyl)benzotriazole present within this reaction product which thereby indicated a conversion of about 98% to the 5-(3-hydroxybutenyl-1)ether of 5-hydroxy-2-(2-hydroxyphenyl) benzotriazole.

EXAMPLE III

This example illustrates the preparation of the 5 - (3-acryloxy - 2-hydroxypropyl) ester of 2-(5-carboxy-2-hydroxyphenyl)benzotriazole, i.e.

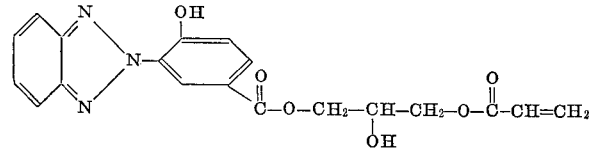

by means of the process of this invention.

An agitated mixture of 14.1 parts of glycidyl acrylate, 25.5 parts of 2-(5-carboxy-2-hydrophenyl)benzotriazole, and 0.4 part of tetrabutylammonium bromide was heated to a temperature in the range of 80° C. and maintained at that temperature for a period of 10 hours. Upon being cooled to room temperature, the resulting reaction product, which was in the form of a viscous oil, was removed and subjected to a base titration. The latter analysis revealed that there was about 1% of unreacted 2-(5-carboxy-2-hydroxyphenyl)benzotriazole present within this reaction product which thereby indicated a conversion of about 98% to the 5-(3-acryloxy-2-hydroxypropyl)ester of 2-(5-carboxy-2-hydroxyphenyl)benzotriazole.

EXAMPLE IV

This example illustrates the preparation of the 5-(3-allyloxy-2-hydroxypropyl)ester of 5-carboxy-2-(5-methyl-2-hydroxyphenyl)benzotriazole, i.e.

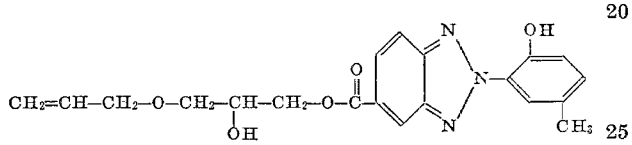

An agitated mixture of 12.8 parts of allyl glycidyl ether, 26.9 parts of 5-carboxy-2-(5-methyl-2-hydroxyphenyl) benzotriazole, and 0.5 part of tetramethylammonium iodide was heated to a temperature of 75° C. and maintained at that temperature for a period of 10 hours. Upon being cooled to room temperature, the resulting reaction product, which was in the form of a viscous oil, was removed and subjected to a base titration. The latter analysis revealed that there was less than 1% of unreacted 5-carboxy-2 - (5 - methyl-2-hydroxyphenyl) benzotriazole present within this reaction product which thereby indicated a conversion of about 98.5% to the 5-(3-allyloxy-2-hydroxypropyl) ester of 5-carboxy-2-(5-methyl-2-hydroxyphenyl)benzotriazole.

EXAMPLE V

This example illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 90:10:1 vinylidene:chloride: acrylate:4-(3-methacryloxy-2-hydroxypropyl)ether of 2-(2,4-dihydroxyphenyl)benzotriazole terpolymer was prepared by charging the following ingredients into a reactor equipped with a reflux condenser as well as with means for mechanical agitation.

| | Parts |
|---|---|
| Vinylidene chloride | 90.0 |
| Eethyl acrylate | 10.0 |
| The 4-(3-methacryloxy-2-hydroxypropyl)ether of 2-(2,4-dihydroxyphenyl) benzotriazole | 1.0 |
| Sodium lauryl sulfate | 1.5 |
| Sodium dodecyl benzene sulfonte | 2.0 |
| Sodium bicarbonate | 0.3 |
| Sodium bisulfite | 0.2 |
| Ammonium persulfate | 0.25 |
| Water | 100.0 |

The above mixture was then refluxed at 33–35° C. for a period of 5 hours thereby resulting in a latex with a resin solids content of 50%, by weight, and an intrinsic viscosity, as determined in tetrahydrofuran at 30° C. of 0.82.

This latex was then used in the preparation of films, having a wet thickness of 3.0 mils, which were cast upon sheets of white paper. Various samples of these coated sheets were then exposed to 14 hours of direct sunlight. As a control for these tests, similarly coated sheets were exposed under the identical conditions; however, the coatings of these control sheets were derived from a 90:10 vinylidene chloride; ethyl acrylate copolymer latex made with a recipe which was identical to that described above but which did not contain the 2-(2-hydroxyphenyl)benzotriazole monomer.

The effect of the direct sunlight upon these resin films was determined, with respect to any color change which had occurred, by utilizing a Photovolt Reflectometer, Model No. 610; a device which records proportionately higher readings with the increased yellowing of the particular coatings being evaluated. The following table presents the results of these tests. In this table, the reflectometer readings which are given represent the difference between the readings obtained from the freshly prepared coatings as against the readings obtained subsequent to their exposure to the light source. Thus, a higher degree of discoloration will, of course, be indicated by a higher reading.

| No. | Coating resin | Reflectometer reading |
|---|---|---|
| Control | 90:10 vinylidene chloride: ethyl acrylate | 24.0 |
| 1 | 90:10:1 vinylidene chloride: ethyl acrylate:4-(3-methacryloxy-2-hydroxypropyl)ether of 2-(2,4-dihydroxyphenyl)benzotriazole. | 2.0 |

The above data serve to indicate that the novel copolymers of our invention are far superior in their resistance to the effects of ultra-violet radiation as compared with comparable polymers which do not contain the ultraviolet absorbing 2 - (2 - hydroxyphenyl)benzotriazole moiety.

EXAMPLE VI

This example illustrates the preparation of another of our novel copolymers by means of a solution polymerization technique.

A toluene lacquer of a 100:1 styrene:5-(3-hydroxybutenyl-1)ether of 5-hydroxy-2-(2-hydroxyphenyl)benzotriazole copolymer was prepared by charging the following ingredients into a reactor equipped with a reflux condenser as well as with means for mechanical agitation.

| | Parts |
|---|---|
| Styrene | 100.0 |
| The 5-(3-hydroxybutenyl-1)ether of 5-hydroxy-2-(2-hydroxyphenyl)benzotriazole | 1.0 |
| Tertiary butyl hydroperoxide | 0.5 |
| Toluene | 150.0 |

Under agitation, the above mixture was then refluxed at 110° C. for a period of 6 hours whereupon it was allowed to cool and discharged from the reactor. The resulting lacquer had a resin solids content of 37.5%, by weight, indicating a conversion of 94%. Films derived from this lacquer demonstrated greatly improved resistance to the degradative effects of ultra-violet radiation after prolonged outdoor exposure in contrast to comparable films derived from a similarly prepared styrene homopolymer lacquer.

EXAMPLE VII

This example again illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 55:45:1 vinyl chloride:dibutyl maleate: 5-(3-acryloxy-2-hydroxypropyl)ester of 2-(5-carboxy-2-hydroxyphenyl)benzotriazole terpolymer was prepared by charging the following ingredients into a pressurized reactor.

| | Parts |
|---|---|
| Vinyl chloride | 55.0 |
| Dibutyl maleate | 45.0 |
| The 5-(3-acryloxy-2-hydroxypropyl) ester of 2-(5-carboxy-2-hydroxyphenyl) benzotriazole | 1.0 |
| Octyl phenoxy polyoxyethylene ethanol | 7.5 |
| Sodium lauryl sulfate | 2.0 |
| Ammonium persulfate | 0.4 |
| Water | 168.0 |

The above mixture was then maintained at a temperature of 70° C. for a period of 8 hours resulting in a latex which had a resin solids content of 37.1%, by weight, and an intrinsic viscosity, as determined in tetrahydrofuran at 30° C., of 0.70.

This latex was then used in the preparation of films having a wet thickness of 3.0 mils which were cast upon glass plates. Various samples of these coated plates were then exposed to the equivalent of 5 months of continuous sunlight by being placed at a distance of 2 feet from a mercury vapor photochemical lamp which was enclosed, together with the coated plates, in a ventilated, lightproof cabinet for a period of 5 days. As a control for these tests, similarly coated plates were exposed under identical conditions; however, the coatings of these controls were derived from a 55:45 vinyl chloride:dibutyl maleate copolymer latex made with a recipe which was identical to that described above but which did not contain the 2-(2-hydroxyphenyl)benzotriazole monomer.

In evaluating the results of these tests, it was noted that the films derived from the novel terpolymer of our invention demonstrated greatly improved resistance to the degradative effects of ultra-violet radiation inasmuch as they successfully retained their flexibility and clarity whereas the control films became extremely brittle, discolored, and tended to crumble upon being handled.

EXAMPLE VIII

This example again illustrates the preparation of one of the novel copolymers of our invention by means of an acqueous emulsion polymerization technique and also demonstrates the improved resistance of the resulting copolymer to the degradative effects of ultra-violet radiation.

An aqueous latex of a 100:29:1 vinyl acetate:dibutyl maleate: 5-(3-allyloxy-2-hydroxypropyl)ester of 5-carboxy - 2 - (5-methyl-2-hydroxyphenyl)benzotriazole terpolymer was prepared by charging the following ingredients into a reactor equipped with a reflux condenser as well as with means for mechanical agitation.

| | Parts |
|---|---|
| Vinyl acetate | 100.0 |
| Dibutyl maleate | 29.0 |
| 5-(3-allyloxy-2-hydroxypropyl) ester of 5-carboxy - 2 - (5 - methyl - 2 - hydroxyphenyl) benzotriazole | 1.0 |
| Polyvinyl alcohol (87% hydrolyzed, medium viscosity grade) | 3.0 |
| Ammonium persulfate | 0.5 |
| Water | 100.0 |

The above mixture was then maintained at a temperature of 94° C. for a period of 8 hours resulting in a latex which had a resin solids content of 49.3%, by weight, and an intrinsic viscosity, as determined in acetone at 30° C., of 0.54.

This latex was then used in the preparation of films having a wet thickness of 3.0 mils which were cast upon glass plates. Various samples of these coated plates were then exposed to direct sunlight for a period of 3 months. As a control for these tests, similarly coated plates were exposed under identical conditions; however, the coatings of these control sheets were derived from a 100:29 vinyl acetate:dibutyl maleate copolymer latex made with a recipe which was identical to that described above but which did not contain the 2-(2-hydroxyphenyl)benzotriazole monomer.

In evaluating the results of these tests, it was noted that the films derived from the novel terpolymer of our invention demonstrated greatly improved resistance to the degradative effects of ultra-violet radiation inasmuch as they successfully retained their flexibility and could be removed intact from the glass plates upon which they had been cast whereas the control films became extremely brittle and crumbled upon being removed from their glass plates.

Summarizing, our invention is thus seen to provide a novel class of ethylenically unsaturated 2-(2-hydroxyphenyl)benzotriazole derivatives which may be incorporated into a wide variety of copolymers which are characterized by their outstanding resistance to the degradative effects of ultra-violet radiation. Variations may be made in proportions, procedures and materials without departing from the scope of this invention as defined by the following claims.

What we claim is:
1. An ethylenically unsaturated derivative of 2-(2-hydroxyphenyl)benzotriazole selected from the group consisting of:

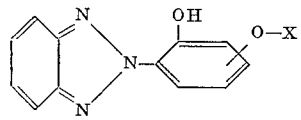

I

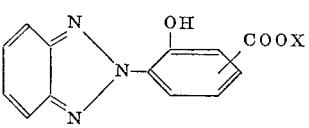

II

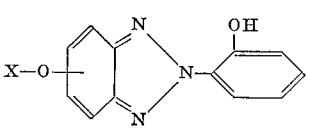

III and

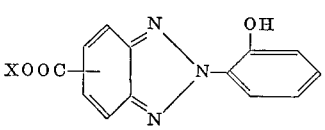

IV wherein X represents an ethylenically unsaturated radical selected from the group consisting of the beta-hydroxypropyl acrylate, beta-hydroxypropyl methacrylate, (3-allyloxy-2-hydroxy)propyl, and (3-hydroxy)butenyl-1 radicals.

2. A composition comprising a polymer of at least one ethylenicaly unsaturated monomer together with at least one ethylenically unsaturated 2-(2-hydroxyphenyl)benzotriazole derivative selected from the group consisting of:

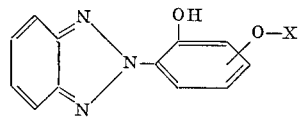

I

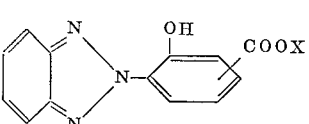

II

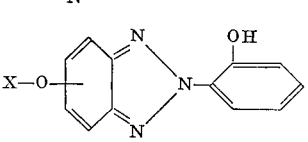

III and

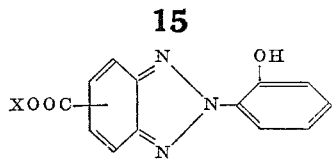

wherein X represents an ethylenically unsaturated radical selected from the group consisting of the beta-hydroxypropyl acrylate, beta-hydroxypropyl methacrylate, (3-allyloxy-2-hydroxy) propyl and (3-hydroxy)butenyl-1 radicals.

3. The composition of claim 2, wherein said ethylenically unsaturated monomer is selected from the group consisting of styrene, alpha-methyl styrene, the acrylic and methacrylic esters of aliphatic alcohols, acrylic acid, methacrylic acid, isoprene, acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

4. The composition of claim 2, wherein said ethylenically unsaturated 2-(2-hydroxyphenyl)benzotriazole moiety is present in a proportion of at least 0.1%, by weight.

5. A composition in accordance with claim 4, in which vinylidene chloride and ethyl acrylate are polymerized with the 4-(3-methacryloxy-2-hydroxypropyl)ether of 2-(2,4-dihydroxyphenyl)benzotriazole.

6. A composition in accordance with claim 4, in which styrene is polymerized with the 5-(3-hydroxy butenyl-1) ether of 5-hydroxy-2-(2-hydroxyphenyl)benzotriazole.

7. A composition in accordance with claim 4, in which vinyl chloride and dibutyl maleate are polymerized with the 5-(3-acryloxy-2-hydroxypropyl)ester of 2-(5-carboxy-2-hydroxyphenyl)benzotriazole.

8. A composition in accordance with claim 4, in which vinyl acetate and dibutyl maleate are polymerized with the 5-(3-allyloxy-2-hydroxypropyl)ester of 5-carboxy-2-(5-methyl-2-hydroxyphenyl)benzotriazole.

References Cited

UNITED STATES PATENTS 3,162,676   12/1964   Goldberg _____ 260—486
3,399,173   8/1968   Heller _____ 260—47

FOREIGN PATENTS 974,713   11/1964   Great Britain.

JOSEPH L. SCHOFER, Primary Examiner

C. A. HENDERSON, Jr., Assistant Examiner

U.S. Cl. X.R.

117—124, 155; 260—29.6, 80.72, 308, 473, 486, 613, 614